Aug. 5, 1952   M. P. CHADWICK   2,605,579
BAIT HOLDER
Filed Oct. 8, 1949

MICHAEL P. CHADWICK
INVENTOR

BY Clarence W. Carroll
AGENT

Patented Aug. 5, 1952

2,605,579

UNITED STATES PATENT OFFICE 2,605,579

BAIT HOLDER

Michael Phillip Chadwick, Rochester, N. Y.

Application October 8, 1949, Serial No. 120,401

2 Claims. (Cl. 43—44.4)

This invention relates to bait holders, and more particularly to devices used by fishermen to support or retain a lure such as a live bait in a more or less natural position, so that it will prove more attractive to a fish.

Bait holders have been used in which a wrapping or harness of wire, or clamps, have been utilized to enfold or retain a bait on a "plug" or other weighted object at the end of a fishing line, hooks being also a part of the device. This type of lure has proved unsatisfactory for the reason that any wire device, even a wire spring, is awkward to manipulate and difficult to hold in its required relation to the bait.

An object of the present invention is to provide a holder of extremely simple construction, and so arranged that when a bait is laid upon it, an ordinary rubber band or a similar elastic member may be given a twist and will then hold the bait securely until a fish takes the lure, or until the fisherman wishes to remove it. An opposite twist will then dislodge the band for removal of the bait. Further objects, one of which is to produce an article cheaply and easily manufactured, will appear in the specification following, and in the drawings herewith, in which.

Figure 4:
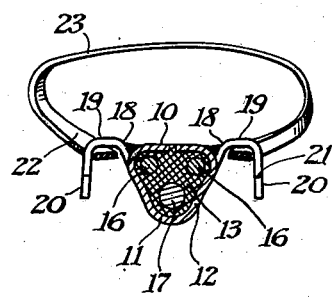
Fig. 4 is a transverse section on line 4—4 of Fig. 2.
Figure 3:
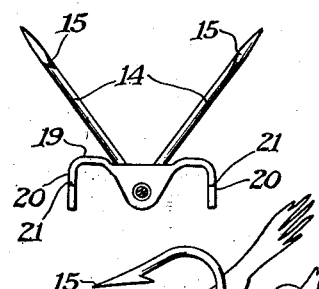
Fig. 3 is an end elevation.

The holder is preferably formed of non-rusting sheet metal, rolled to provide an elongated flat top 10, a keel-like or substantially V-shaped bottom 11, and tapered or inclined side faces 12. The edges of the sheet metal may terminate in the center of the flat top as shown in Fig. 4, or may be at the bottom or one side.

The holder body, when formed up as above described, may be equipped with one or more hooks 14 having the usual barbs 15 and straight shanks 16, and the latter may be solidly retained in the relation indicated in the drawings by being embedded in a matrix 13, preferably of lead, solder, or other low-melting-point metal or metal alloy. A leader 17 for attachment to a fishing line also may be embedded and retained in the matrix 13, and may extend from the opposite end of the body portion.

The improved performance and a point believed novel resides in a series of laterally-extending lugs or band-retaining projections which may be formed or stamped in the flat when the sheet metal is fabricated and before it is folded to the finished contour illustrated. These lugs, when the holder has been formed and finished, extend upwardly at 18, outwardly parallel with the top 10 at 19, and then downwardly as at 20. Shoulders 21 are also provided near the ends of the lugs, the better to retain the elastic member or retainer 22.

The lugs 18—20 may be of other forms than that shown. They might be rounded or pointed, and extend at a greater or less angle to the surface 10.

Figure 1:
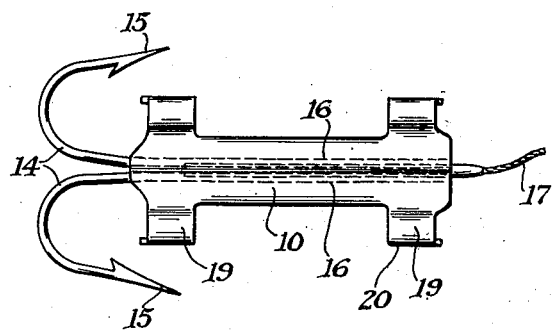
Fig. 1 is a top plan of a bait holder designed and constructed in accordance with this invention.
Figure 2:
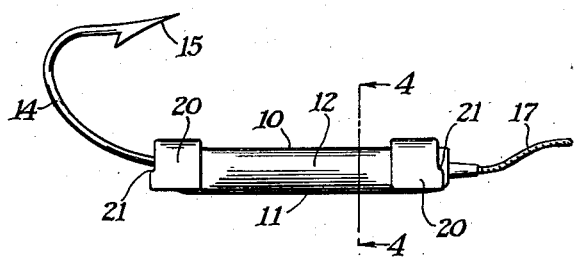
Fig. 2 is a side elevation.
Figure 5:
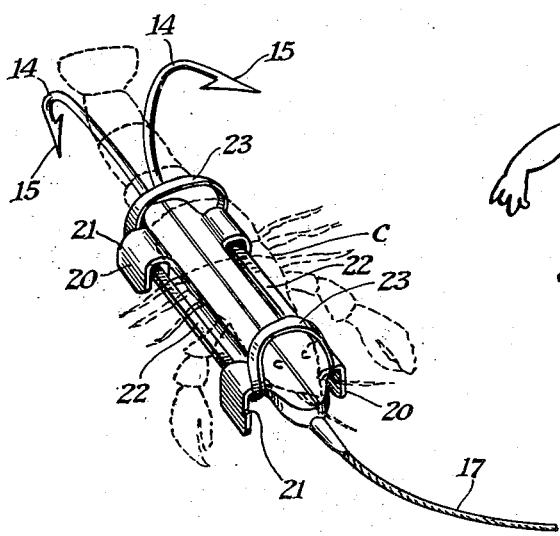
Fig. 5 is a perspective view of a complete holder, indicating the manner of securing a bait thereto.

The user of the device lays a bait, such as the crayfish shown in broken lines at C in Fig. 5, bottomside down on the upper surface 10. Then, taking an ordinary rubber band 22, he places one portion 23 of it over the middle portion of the crayfish, loops both sides under the lugs at both ends, and then places the remainder of the band over the head as shown, so that the bait is held snugly against the surface 10 but is easily removed or replaced by merely stretching the band loops 23 and "unhooking" the band from the lugs.

Figure 6:
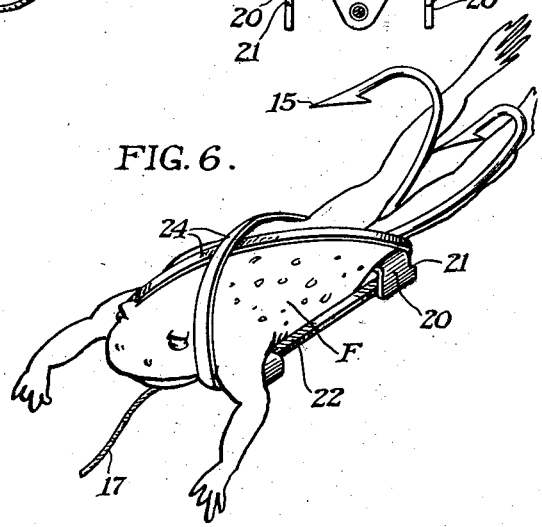
Fig. 6 is a similar perspective view, showing another type of bait and the manner in which the band above referred to is utilized.

It may be desirable to use other types of bait or lures, such as a frog shown at F in Fig. 6. A more secure hold is then obtained by crossing the band over the top of the bait as at 24, so that it is very unlikely to be pried off under the lugs 20 as the live bait moves.

The rear extremities (tail or legs) of the bait are preferably extended between or around the hooks 14, as a fish usually attacks a live bait from the rear, and is thus more likely to be caught.

The portion 11 of the holder acts somewhat like a keel, in that it tends to remain downward when a bait is in place, so that the frog or other creature will tend to assume a natural position when pulled through the water.

The foregoing description and illustrations set forth a preferred form of the invention. However, it is contemplated that the invention shall include any variants or modifications thereof that lie within the terminology of the following claims.

What I claim is:

1. A bait holder comprising an elongated hollow body having a flat top and a keel-like bottom said body having a substantially triangular shaped cross-sectional configuration throughout its length and having lugs extending laterally and downwardly near the ends thereof, hooks at one end of the body and a leader at its opposite end, said hooks and leader being anchored within the body in a metal matrix of approximately the composition of soft solder.

2. A bait holder having a hollow body portion formed of sheet material shaped so as to have a substantially triangular cross-sectional configuration said body being filled with a metal matrix approximating soft solder, lugs extending laterally and downwardly adjacent the ends of the body, and one or more hooks and a leader anchored in the metal matrix, said hooks and said leader extending from opposite ends of the lure body.

MICHAEL PHILLIP CHADWICK.

REFERENCES CITED

The following references are of record in the file of this patent:

UNITED STATES PATENTS

| Number | Name | Date |
|---|---|---|
| 915,707 | Sheward | Mar. 16, 1909 |
| 2,165,734 | Stracener | July 11, 1939 |
| 2,273,582 | Maire | Feb. 17, 1942 |
| 2,463,369 | Finlay et al. | Mar. 1, 1949 |